Nov. 9, 1965   N. J. DION   3,216,462

PRODUCTION OF SMALL MESH WIRE NETTING

Filed Oct. 10, 1963

INVENTOR
NORMAN J. DION

BY *Charles R. Fay*
ATTORNEY

United States Patent Office 3,216,462
Patented Nov. 9, 1965

3,216,462
PRODUCTION OF SMALL MESH WIRE NETTING
Norman J. Dion, Oxford, Mass., assignor to G. F. Wright Steel & Wire Company, Worcester, Mass., a corporation of Massachusetts
Filed Oct. 10, 1963, Ser. No. 315,296
1 Claim. (Cl. 140—6)

This invention relates to the production of wire netting commonly referred to as "poultry netting," and the principal object of the invention resides in the provision of means whereby the ordinary six-sided opening or interstice in the netting may be cut in half in area simply by the provision of a straight wire laid in and fastened to the poultry netting, said straight wires being located across the long dimension of each of the openings or interstices and being connected thereto by being wound into the side wires thereof to the general end that a poultry netting of relatively small size mesh may be produced without the necessity of changing parts of the netting making machine except to provide for the straight wires aforesaid running through the center of each of the openings in the netting, this being provided by a new and improved stripping staple.

The stripping staple above referred to is utilized for removing the form netting from the forming rolls therefor. Reference is made to U.S. Patent 2,544,838 dated March 13, 1951 which discloses a machine and method for producing poultry netting, the poultry netting of the present invention being produced on a similar machine and including wire seating rolls, seating the wires of the fabric in twister gear slots so as to provide the hexagonal configuration of the wires while twisting them together to form the fabric, the staple above referred to being provided in continuous arrangement on the surface of a roll and cooperating with the wire forming slots in order to strip the fabric from the slots in order that it may proceed on to takeup rolls, etc.

The new staple of the present invention is provided with a new and improved form by which means the straight wires may be laid in in parallel spaced conformation as for instance in the nature of warp wires. This is impossible with prior art machines without removal of stripping staples of the prior art in sufficient quantity to enable the laying in of the additional straight warp wires. It has been found that the removal of sufficient staples to accomplish this purpose results in malfunctions of the stripping staples and lack of sufficient guiding action thereof, but with the present invention it is possible to lay in the additional straight warp wires (or to omit the same if desired) without the removal of any staples, and this is accomplished by providing means in each of the novel staples for receiving the warp wires therein.

The invention further relates to arrangements and combinations of parts which will be hereinafter described and more particularly set forth in the appended claim.

Reference is to be had to the accompanying drawings, in which.

Figure 1:
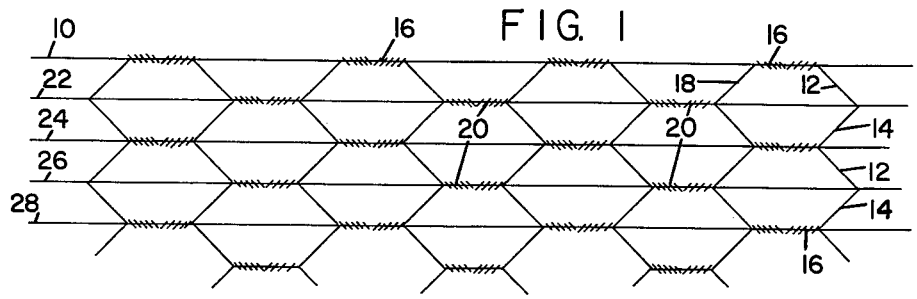
FIG. 1 illustrates the poultry netting made according to the present invention.

Poultry netting is formed by providing a series of wires which are laterally bent and intertwisted to form the well known hexagonal opening poultry wire. Such wire is shown in FIG. 1 but in this case it is desired to reduce the openings in the netting without the necessity of complete resetting of the wire forming parts of the machine.

The poultry netting of the prior art is illustrated by the reference numerals 10, 12 and 14. The reference numeral 10 indicates a straight line wire or selvage. The wire 12 is originally straight but is regularly offset to one side in the areas at 16 where it is intertwisted with respect to the line wire 10, then returns at 18 to its original line position as at 20 and is intertwisted in the area at 20 with respect to a portion of the next wire 14 which has been offset in a manner comparable to that at 16. This is all well known in the prior art.

However if it is desired to make a poultry netting of a smaller mesh, then it is necessary to completely reset the machine and change the wire forming and twisting parts, or it is necessary to use a completely different machine. With the present invention however, straight line wires 22, 24, 26, 28, etc. may be laid in and twisted in the areas 16 and 20 in order to cut the interstices in half without the necessity of rearranging or changing any of the parts of a machine.

Figure 2:
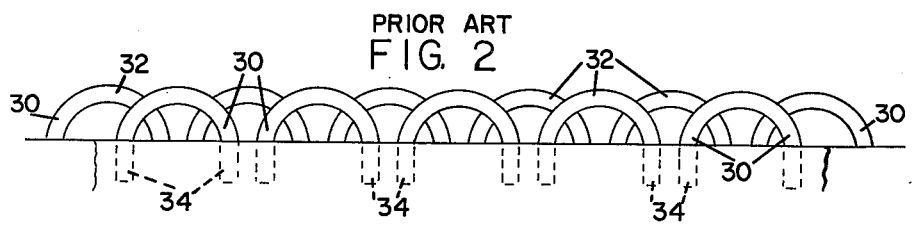
FIG. 2 illustrates the stripping staples of the prior art.

In the prior art, when the wire has been formed as above described in the wire forming or twister gear slots, the fabric must be stripped from the mechanism and this is done ordinarily by means of the U-shaped staples shown in FIG. 2. These staples comprise legs 30, 30 and gently curved closed connecting ends 32. These staples are laid in a roll surface and secured at 34 by any desired means. The staples are arranged in alignment in rows along the surface of the stripper roll, the rows being spaced a distance corresponding to the length of the mesh. There is a staple for each opening in the fabric. Therefore it will be seen that the staples are staggered as indicated in FIG. 2 so that each staple will enter an opening in the fabric, i.e., as between twists 16, 16 and 20, 20, and by so interfitting the fabric can be stripped from the wire twisting means. However it will be apparent that these staples have to be removed if it is desired to lay in any of the straight line wires 22, 24, 26, 28, etc. because otherwise they will engage and distort the wires and in some cases disrupt the twists. It is therefore clearly impossible to insert as many straight line wires 22, 24, etc. as may be required although it is possible to remove a few staples and insert a few line wires in order to give a little additional longitudinal strength to the netting.

Figure 3:
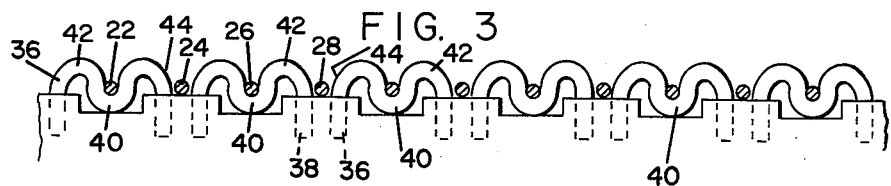
FIG. 3 illustrates the stripping staples according to the present invention.

This invention contemplates the use of an alternative staple shown in FIG. 3. These staples are largely the same as those described above with respect to FIG. 2 and may or may not be staggered, but each one comprises a staple which has the legs 36, 38 secured in the roll at their ends as before and extending towards each other in a sort of wave form providing a recess 40 extending to the roll surface and affording reception of the straight line wires which are indicated in FIG. 3 by the numerals corresponding to those in FIG. 1.

Therefore it will be seen that the straight line wires can be accommodated by the stripper rolls but the stripper rolls will still perform their stripping function by reason of the projecting parts at 42, 42. The wires will of course be received in the depressions at 40 and also between the legs in the area between aligned staples as indicated by the reference numeral 44 in FIG. 3.

Having thus described my invention and the advantages thereof, I do not wish to be limited to the details herein disclosed, otherwise than as set forth in the claim, but what I claim is:

Stripping apparatus for poultry netting making machines comprising a roll, a series of rows of staples secured to the roll, each row of staples being radially arranged with respect to the roll and in line longitudinally of the roll substantially from end-to-end thereof, each staple comprising a pair of spaced free-end legs and means connecting the legs, the legs being secured in the roll at the free ends thereof in closely adjacent relationship with respect to each other, the means connecting the legs comprising a run having a depressed conformation generally centrally thereof between the legs of the staples, whereby straight line wires to be applied to the poultry netting may be accommodated in the stripping staples in the depressions thereof and between the adjacent legs of adjacent staples.

References Cited by the Examiner

UNITED STATES PATENTS

| | | | |
|---|---|---|---|
| 2,048,341 | 7/36 | Kitselman | 140—6 |
| 2,544,838 | 3/51 | Kitselman | 140—6 |
| 2,741,147 | 4/56 | Marano | 85—49 |
| 2,811,073 | 10/57 | Klopstock | 85—49 |

FOREIGN PATENTS

| | | |
|---|---|---|
| 592,129 | 5/30 | Germany. |
| 2,603 | 1/14 | Great Britain. |
| 5,977 | 3/12 | Great Britain. |
| 280,542 | 12/27 | Great Britain. |
| 321,068 | 10/29 | Great Britain. |
| 513,013 | 2/55 | Italy. |

CHARLES W. LANHAM, *Primary Examiner.*